US011681869B2

(12) United States Patent
Handy Bosma et al.

(10) Patent No.: US 11,681,869 B2
(45) Date of Patent: Jun. 20, 2023

(54) METHODS AND SYSTEMS FOR MANAGING COLLABORATIVE EDITING OF CONTENT

(71) Applicant: INTERNATIONAL BUSINESS MACHINES CORPORATION, Armonk, NY (US)

(72) Inventors: John Handy Bosma, Leander, TX (US); Ryan Kallicharran, Rochester, MN (US); Elizabeth Kelly, Astoria, NY (US); Jana H. Jenkins, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 16/743,793

(22) Filed: Jan. 15, 2020

(65) Prior Publication Data
US 2021/0216705 A1 Jul. 15, 2021

(51) Int. Cl.
G06F 40/197 (2020.01)
G06F 40/166 (2020.01)
G06F 16/93 (2019.01)

(52) U.S. Cl.
CPC ............ *G06F 40/197* (2020.01); *G06F 16/93* (2019.01); *G06F 40/166* (2020.01)

(58) Field of Classification Search
CPC ............................... G06F 40/197; G06F 16/93
See application file for complete search history.

(56) References Cited

U.S. PATENT DOCUMENTS

| 7,822,690 | B2* | 10/2010 | Rakowicz | G06Q 10/10 380/278 |
| 2008/0244418 | A1 | 10/2008 | Manolescu et al. | |
| 2012/0233543 | A1 | 9/2012 | Vagell et al. | |
| 2013/0339847 | A1 | 12/2013 | Bartek et al. | |
| 2014/0281872 | A1* | 9/2014 | Glover | G06F 40/194 715/229 |
| 2015/0339020 | A1* | 11/2015 | D'Amore | G06F 3/0484 715/753 |
| 2015/0379294 | A1* | 12/2015 | Cohen | H04L 65/403 726/28 |

FOREIGN PATENT DOCUMENTS

KR 1750429 B1 6/2017

* cited by examiner

*Primary Examiner* — Hope C Sheffield
(74) *Attorney, Agent, or Firm* — Griffiths & Seaton PLLC

(57) ABSTRACT

Embodiments for managing collaborative editing of content are provided. At least one user interface is provided to a first user and a second user. The at least one user interface is configured to selectively provide the first user and the second user with the ability to edit content. Time-limited editing periods associated with the at least one user interface are established for the first user and the second user. During a first of the time-limited editing periods, the first user is provided with the ability to edit the content, and the second user is prevented from editing the content. During a second of the time-limited editing periods, the second user is provided with the ability to edit the content, and the first user is prevented from editing the content. The second of the time-limited editing periods does not overlap with the first of the time-limited editing periods.

21 Claims, 8 Drawing Sheets

PATENT TEAM DEMO

Editing ID
702 → sD33jsbTPyvgD8Qh

Your ID
704 → sD33jsbTPyvgD8Qh

706 → Timer: 41

Doc Test

I (AdqB9HLpy9536VLD) have control over the document now. I can switch control by pressing "Submit" or by letting the timer run out.
I (sD33jsbTPyvgD8Qh) have control now:|

708

710 → Submit

Editable div test
712 → I can write in this buffer so I never have to stop my train of thought!

FIG. 7

METHODS AND SYSTEMS FOR MANAGING COLLABORATIVE EDITING OF CONTENT

BACKGROUND OF THE INVENTION

Field of the Invention

The present invention relates in general to computing systems, and more particularly, to various embodiments for managing collaborative editing of content.

Description of the Related Art

In many instances (e.g., in workplace environments), multiple users individually edit (or create) content (e.g., word processing documents, software applications, etc.), or at the very least, are expected to do so. For example, a word processing document may be saved on a database, and multiple users (e.g., inventors, product designers, etc.) may individually access the document (e.g., via a computing device) and make changes, additions, etc., as they deem appropriate.

While various current systems allow for such a process to take place (e.g., allow multiple users to input and change text in a shared document in real-time), such systems may be considered to expose a different set of problems that undercut the value of collaborative editing. For example, such systems lack the ability to ensure diversity, inclusion, and participation in the act of creating or editing a shared document.

SUMMARY OF THE INVENTION

Various embodiments for managing collaborative editing of content, by a processor, are provided. At least one user interface is provided to a first user and a second user. The at least one user interface is configured to selectively provide the first user and the second user with the ability to edit content. Time-limited editing periods associated with the at least one user interface are established for the first user and the second user. During a first of the time-limited editing periods, the first user is provided with the ability to edit the content, and the second user is prevented from editing the content. During a second of the time-limited editing periods, the second user is provided with the ability to edit the content, and the first user is prevented from editing the content. The second of the time-limited editing periods does not overlap with the first of the time-limited editing periods In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a plan view of a user interface according to an embodiment of the present invention.

DETAILED DESCRIPTION OF THE DRAWINGS

Figure 1:
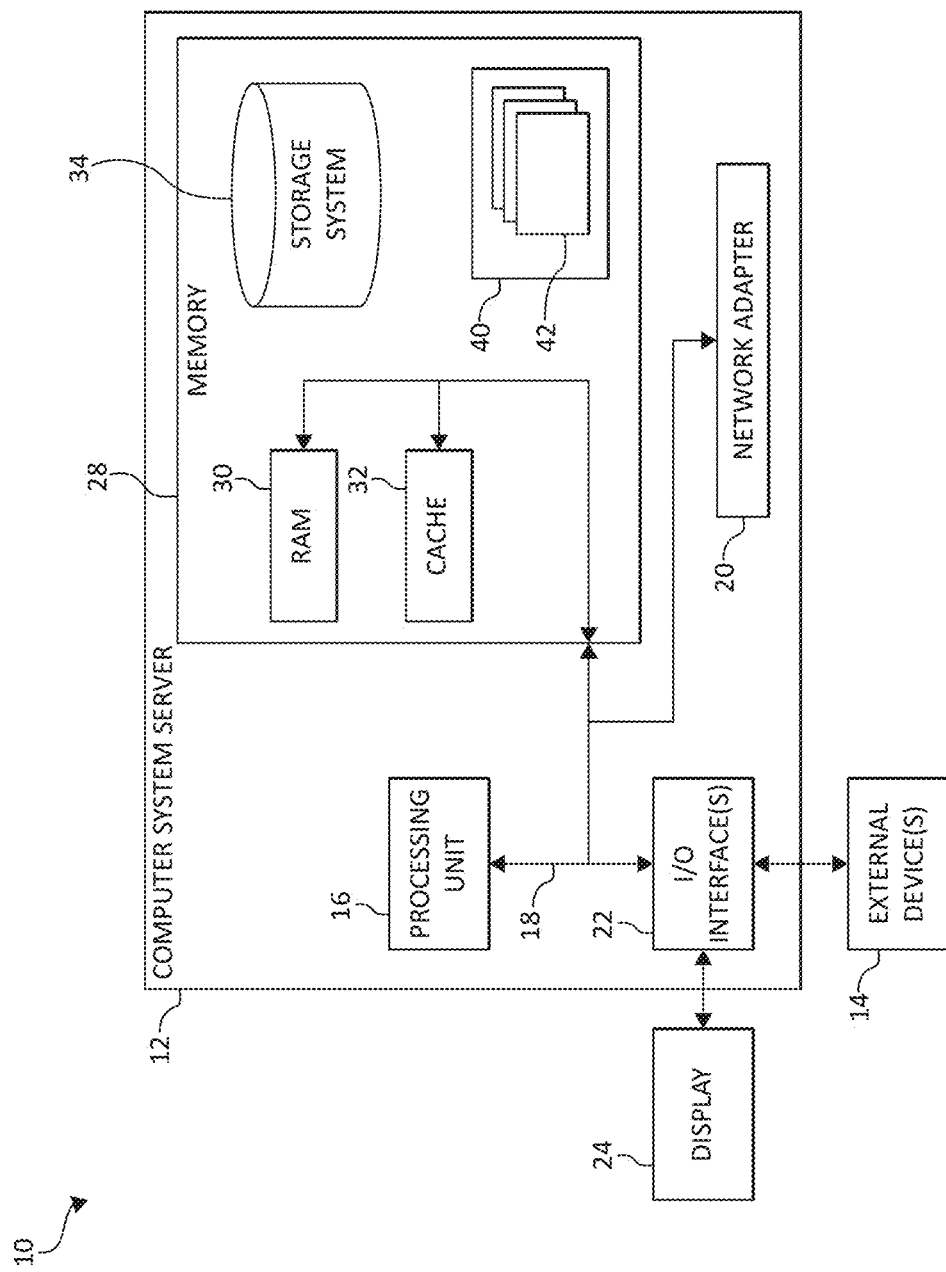
FIG. 1 is a block diagram depicting an exemplary computing node according to an embodiment of the present invention.

As discussed above, in many instances (e.g., in workplace environments), multiple users individually edit (or create) content (e.g., word processing documents, software applications, etc.), or at the very least, are expected to do so. For example, a word processing document may be saved on a database, and multiple users (e.g., inventors, product designers, etc.) may individually access the document (e.g., via a computing device) and make changes, additions, etc., as they deem appropriate.

While various current systems allow for such a process to take place (e.g., allow multiple users to input and change text in a shared document in real-time), such systems may be considered to expose a different set of problems that undercut the value of collaborative editing. For example, such systems lack the ability to ensure diversity, inclusion, and participation in the act of creating or editing a shared document.

More specifically, the features typically found in systems used for collaborative editing (and/or content creation) lead to, for example, lack of coordination among contributors over changes, overwriting of changes, non-participation (e.g., of at least some users), and uncertainty and passivity of some contributors. Additionally, such systems do not provide an acknowledgment of relative contributions or time spent authoring/editing or specific steps for reviewing the contributions of the other users. Further, such systems often fail to return to complete a document due to asynchronous editing.

Overall, these problems lead to a reduction in value compared to what could be achieved with respect to multiple metrics, such as productivity in words per minute and value of contributions, inclusiveness of contributions, insights lost from specific experts, documents that are finished to a high standard of quality (e.g., as judged by their contributors or third parties).

These issues exist primarily because conventional systems lack specific technical affordances to, for example, allocate contribution turns and times among authors, quantify relative contributions in real-time, enable users to learn about and/or be held accountable for their impact on the productivity of authors with whom they are collaborating, and adjust to ensure authors can participate on a more equal footing. It could be said that at least some of these problems exist because the current solutions do not provide for a "social" process of collaborative editing.

To address these needs and/or the shortcomings in the prior art, in some embodiments described herein, methods and/or systems for managing the editing (or creation) of content, or more specifically, the collaborative editing of content, are provided. In some embodiments, each user (e.g., each of multiple selected users, each of the users associated with the content, etc.) is provided with the exclusive ability to edit the content (i.e., a primary piece of content) for a predetermined amount of time (or a timed editing period or a time-limited editing period) while the other users are prevented from doing so.

More specifically, in some embodiments, one or more user interfaces is provided to multiple users, which is/are configured to selectively provide the users with the exclusive ability to edit content (e.g., a text-based document, software application, image, etc.). Timed editing periods (or time-limited editing periods) associated with the user interface(s) are established for the users. During a first of the timed (or time-limited) editing periods, a first user is provided with the ability to edit the content, and a second user (or the other users) is prevented from editing the content. During a second of the timed editing periods, the second user is provided with the ability to edit the content, and the first user (along with any other users besides the second user) is prevented from editing the content. The second of the timed editing periods may not overlap with the first of the timed editing periods (i.e., the second timed editing period may begin/be initiated after the first timed editing period ends).

In other words, in some embodiments, the system manages, controls, etc. the exclusive ability to edit the content by providing "turns" (or timed editing periods) to the users in a manner similar to "chess timers" (e.g., sometimes used in competitive chess matches). That is, the system may provide the exclusive ability to edit content (e.g., a word processing document saved on a database) to one (e.g., a first) user while the other users are "locked out" such that they are not able to edit the content at the same time. This process may be initiated by the system, as opposed to waiting for one of the users to begin editing or creating the content. In other words, in some embodiments, the turns are established and/or initiated before the respective users open, access, and/or begin to edit the content (and/or without the respective users doing so). In some embodiments, after the appropriate users have been identified, the system may provide an indication to the users (e.g., via a visible notification in the user interface, a pop-up window, an electronic communication, etc.) that it is their turn to edit the content (and/or that their editing period has begun).

The turns may last for a predetermined amount of time (e.g., 30 minutes, one hour, etc.), which may be a configurable setting, be different for each user, and/or be configured to provide a predetermined amount of "cumulative" or "overall" time to each user (e.g., a user is given a total of several hours to edit the content over the course of several turns). When the turn of one user ends, the system may "pass" the ability to edit the content to a second user (or give the second user a turn to edit the content), while the other users (including the first user) are locked out. In some embodiments, the order in which the users are provided turns is predetermined. In other words, in some embodiments, after the turn of the first user is completed, the system passes the exclusive ability to edit the content to the second user (and perhaps provides an indication of such to the second user), as opposed to reactively giving the second user the ability to edit the content in response to the second user beginning to do so. In other words, in some embodiments, the turns are managed by the system as opposed to the system reacting to the activity (or lack thereof) of the users. The process may continue as such until all of the appropriate users have been given a turn (e.g., one turn or multiple turns) to edit the content.

As alluded to above, in some embodiments, the turns are timed or more specifically, time-limited. That is, in some embodiments, the system may be configured such that each turn has a maximum amount of time. For example, during their turn, a user may be given (a maximum of) 30 minutes to edit the content, and when that time expires, the system may lock out that user, and pass the turn to another user. However, users may be provided with a manner (e.g., a "button" in a user interface) to indicate that they have made all of the edits they desire in the event they finish before the time expires and relinquish their exclusive editing ability (such that the system then passes the turn to another user). However, in some embodiments, users are provided with a cumulative time to edit the content over several turns. For example, if a user is provided with a total of two hours to edit the content, during each of their turns, the system may track the amount of time they spend editing and prevent them from spending more than two hours total editing the content. In some embodiments, the process may be "paused" (and subsequently "resumed"). For example, if a user is not able to edit the content when their turn begins or is forced to stop editing the content due to other responsibilities, a mechanism may be provided that allows the user (and/or an administrator and/or another user) to stop the timing of the turn until the user is able to edit the content.

In some embodiments, users are provided with a workspace to provide input (e.g., edit, create, etc. additional content) while they are locked out from the primary content (i.e., the content being collaboratively edited, the shared content, etc.), or during another user's turn, without making changes to the primary content. Such a workspace may be referred to as a "buffer." For example, if the content is a word processing type document, the buffer may be a word processing workspace (e.g., a blank "page" or perhaps a copy of the primary content) in the provided user interface, which is external to the primary content and allows the user to create additional content (e.g., write notes, make tentative changes to portions of the primary content without the changes being ingested into the primary content, etc.). In such embodiments, after a user utilizes the buffer, when it is their turn to edit the primary content, the changes, etc. input into the buffer may be utilized to edit the primary content (e.g., via an automated "copy/paste" process, "cut/paste" process, etc.).

In some embodiments, at least some of the users (e.g., a team leader or an administrator) are provided with the ability to "claim" portions of the content and/or allow only some users to edit particular portions of the content. For example, if a user has an expertise that corresponds to a particular portion of the content (e.g., a portion of the content that is related to the particular technological field), that user may claim that portion of the content (and/or be allocated that portion of the content by an administrator) such that only that user may edit that portion of the content (i.e., the other users may not edit that portion of the content even during their turn).

In some embodiments, the edits (or contributions) made by each user are tracked, along with contribution metrics associated with the edits. For example, if the primary content is a text-based document, the system may keep track of, for example, the amount of text (e.g., number of alphanumeric characters, word counts, percentage of total document, etc.) edited, changed, and/or added/deleted by each user. Metrics such as this may be utilized to implement "rules" in the system. For example, at least some of the users may be "required" to edit the content to a particular extent (e.g., regarding word count) during one of their turns and/or cumulatively over the course of multiple turns. If the user does not meet the requirement(s), an indication of such may be generated (e.g., a notification may be generated and provided to the user, the other users, an administrator, etc. such that appropriate action may be taken).

Additionally, in some embodiments, a "playback" functionality is provided such that users may review (e.g., simultaneously (re)view) the progression of the content has the edits were made by the various users, perhaps along with make quick/simple changes and/or come to an agreement in situations in which there are conflicting edits. Further, in some embodiments, various parameters and configuration settings may be adjustable, such as word limits/goals, turn durations, whether or not users are locked out after requirements have been achieved, etc.

In some embodiments (e.g., with text-based content), the system performs (and/or provides) a text analysis to edits made (or content added) to the buffer (and/or within the primary content). The text analysis may be utilized to produce the metrics described above, such as length of text, percentage of total document, additional progress toward goals, concept identification, word and concept co-occurrence measures, and sentiment analysis. The text analysis may utilize one or more natural language processing (NLP) techniques. As the buffer (and/or primary content) is edited, real-time information related to the metrics or other attributes may be displayed. Additionally, when the buffer (and/or the content thereof) is submitted to be incorporated into the primary content, the information may be displayed such that it may be viewed by the other (and/or all of) the users. This information (or other statistics) may be made available in a playback interface such that users may trace the development of the content and observe the contributions made by the various users throughout the entire session (and/or all of the turns of the various users).

At least some of the aspects of functionality described herein may be performed utilizing a cognitive analysis (or machine learning technique). The cognitive analysis may include NLP or an NLP technique, such as classifying natural language, analyzing tone, and analyzing sentiment (e.g., scanning for keywords, key phrases, etc.) with respect to, for example, content (or data), communications sent to and/or received by users, and/or other available data sources. In some embodiments, Mel-frequency cepstral coefficients (MFCCs) (e.g., for audio content detected by a microphone), and/or region-based convolutional neural network (R-CNN) pixel mapping (e.g., for object detection/classification in images/videos), as are commonly understood, are used.

The processes described herein may utilize various information or data sources associated with users and/or content. With respect to users, the data sources may include, for example, any available data sources associated with the user. For example, in some embodiments, a profile (e.g., a cognitive profile) for the user(s) may be generated. Data sources that may be used to generate a cognitive profile for the user(s) may include any appropriate data sources associated with the user that are accessible by the system (perhaps with the permission or authorization of the user). Examples of such data sources include, but are not limited to, communication sessions and/or content thereof (e.g., edits made to content, chatbot interactions, phone calls, video calls, text messaging, emails, in person/face-to-face conversations, etc.), a profile of (or basic information about) the user (e.g., job title, place of work, length of time at current position, family role, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, managing collaborative editing of content, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

It should be understood that as used herein, the term "computing node" (or simply "node") may refer to a computing device, such as a mobile electronic device, desktop computer, etc. and/or an application, such as a content editing application/user interface, word processing application, chatbot, an email application, a social media application, a web browser, etc. In other words, as used herein, examples of computing nodes include, for example, computing devices such as mobile phones, tablet devices, desktop computers, or other devices, such as appliances (IoT appliances) that are owned and/or otherwise associated with individuals (or users), and/or various applications that are utilized by such computing devices.

Additionally, although particular aspects of functionality described herein may be described as being related to editing text-based content (e.g., text-based documents, such as word processing documents, spreadsheets, etc.), it should be understood that the methods and systems described herein may be applied to other types of content, such as software applications (and/or the code thereof), images, video files, audio clips, etc. It should also be noted that the embodiments described herein may be applied not only to the collaborative editing of content (i.e., editing previous created/began content) but also to the collaborative creation of content (i.e., multiple users jointly creating/beginning content). Further, it should be noted that the editing or creation of content may be performed in various ways, including text-based input (e.g., via a keyboard, mouse, etc.) and voice commands (e.g., via a microphone).

In particular, in some embodiments, a method for managing collaborative editing of content, by a processor, is provided. At least one user interface is provided to a first user and a second user. The at least one user interface is configured to selectively provide the first user and the second user with the ability to edit content. Time-limited editing periods associated with the at least one user interface are established for the first user and the second user. During a first of the time-limited editing periods, the first user is provided with the ability to edit the content, and the second user is prevented from editing the content. During a second of the time-limited editing periods, the second user is provided with the ability to edit the content, and the first user is prevented from editing the content. The second of the time-limited editing periods does not overlap with the first of the time-limited editing periods The first of the time-limited editing periods may be initiated before the first user begins to edit the content. A duration of the first of the time-limited editing periods may be different than a duration of the second of the time-limited editing periods. The content may include a text-based document.

The at least one user interface may include a workspace external to the content. During the first of the time-limited editing periods, user input may be received from the second user, and additional content associated with the received user input may be caused to be displayed in the workspace. During the second of the time-limited editing periods, the content may be caused to be edited based on the additional content.

Information associated with edits to the content made by the first user during the first of the time-limited editing periods may be caused to be displayed in the at least one user interface during the second of the time-limited editing periods.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
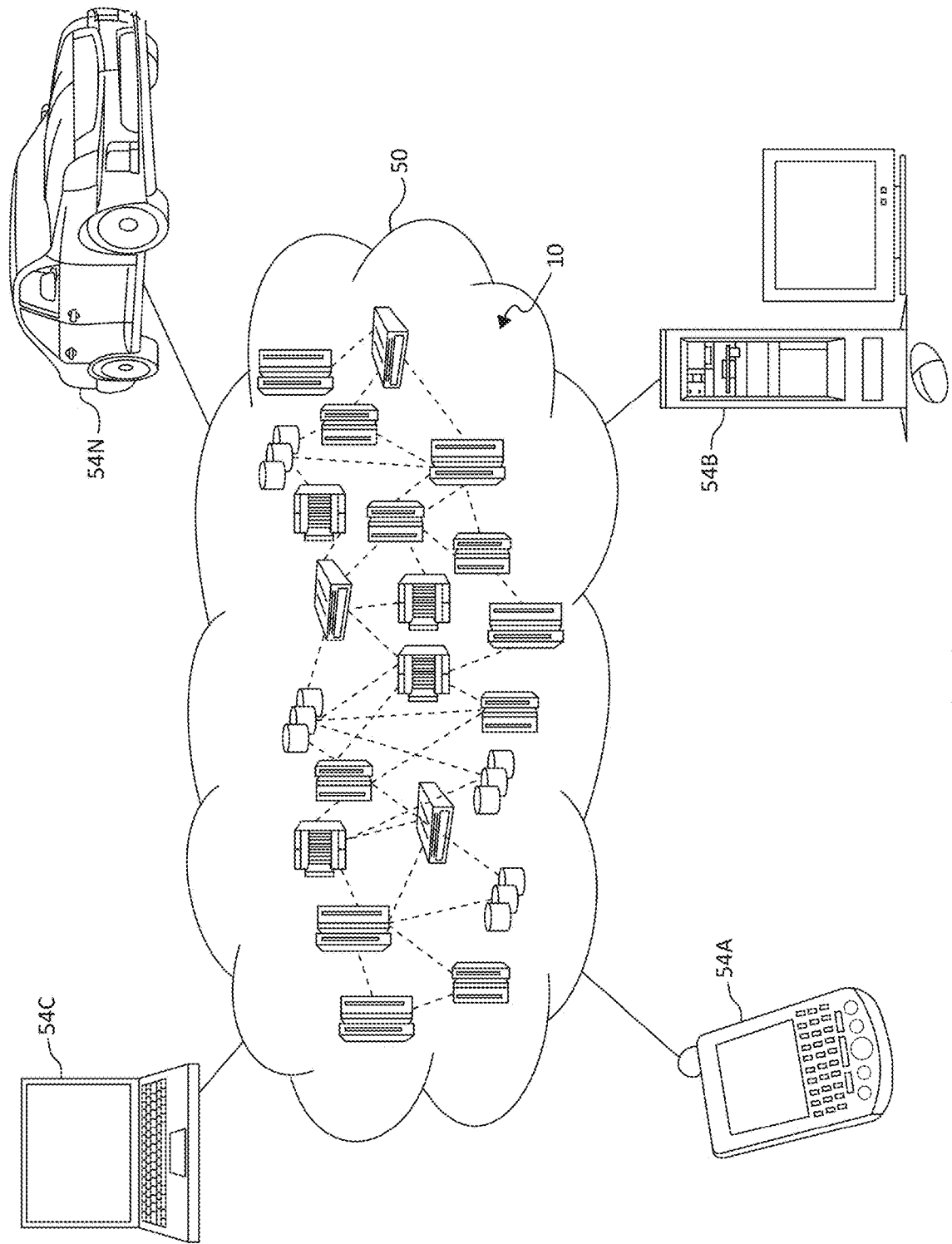
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
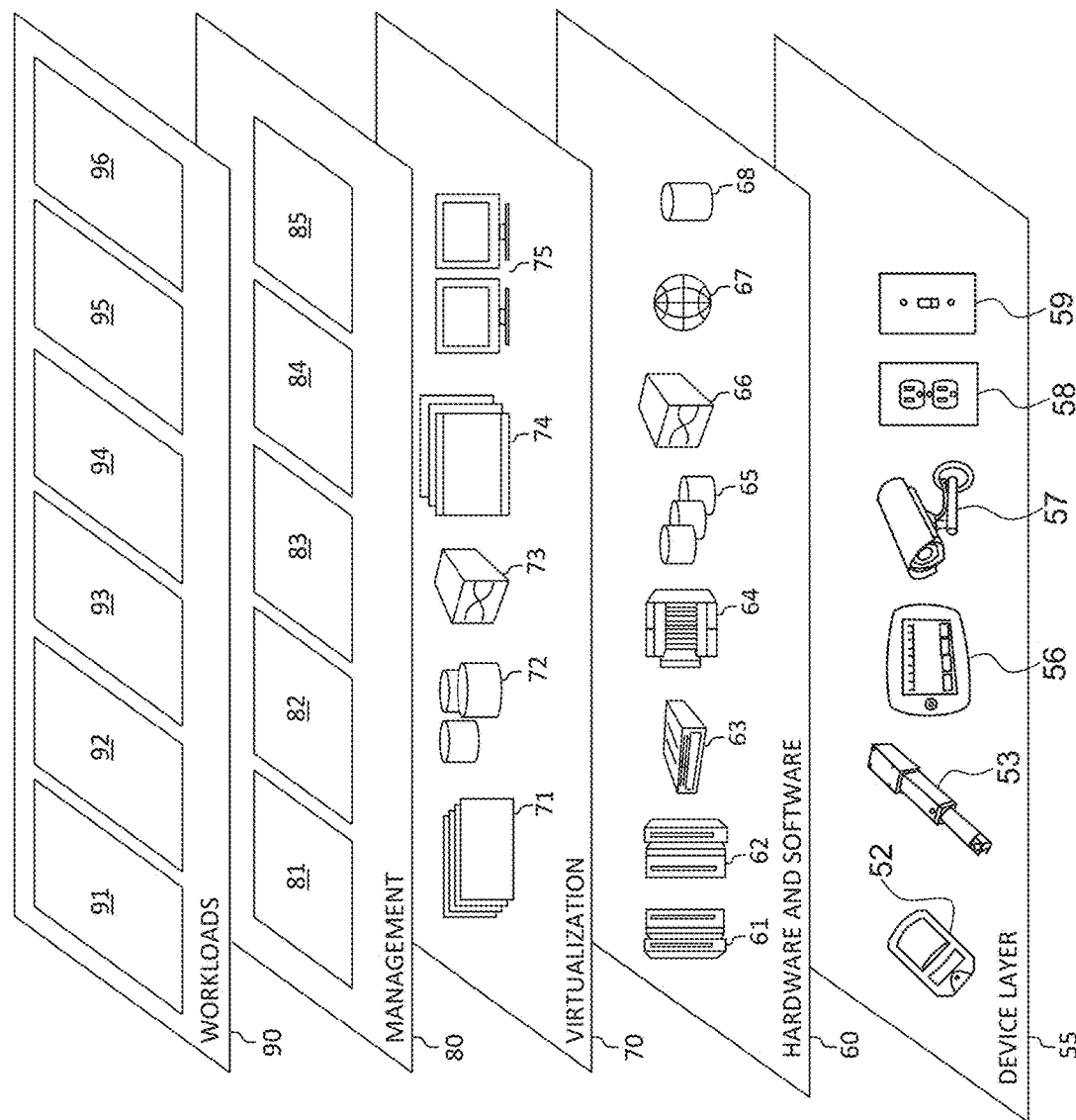
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing collaborative editing of content, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided for managing the editing (or creation), more specifically, the collaborative editing, of content. In some embodiments, each user (e.g., each of the selected users, each of the users associated with the content, etc.) is provided with the exclusive ability to edit the content for a predetermined amount of time (or editing period) while the other users are prevented from doing so. More specifically, in some embodiments, one or more user interfaces is provided to multiple users, which is/are configured to selectively provide the users with the ability to edit content (e.g., a text-based document, software application, image, etc.). Timed (or time-limited) editing periods associated with the user interface(s) are established for the users. During a first of the timed editing periods, a first user is provided with the ability to edit the content, and a second user (or the other users) is prevented from editing the content. During a second of the timed editing periods, the second user is provided with the ability to edit the content, and the first user (along with any other users besides the second user) is prevented from editing the content.

Figure 4:
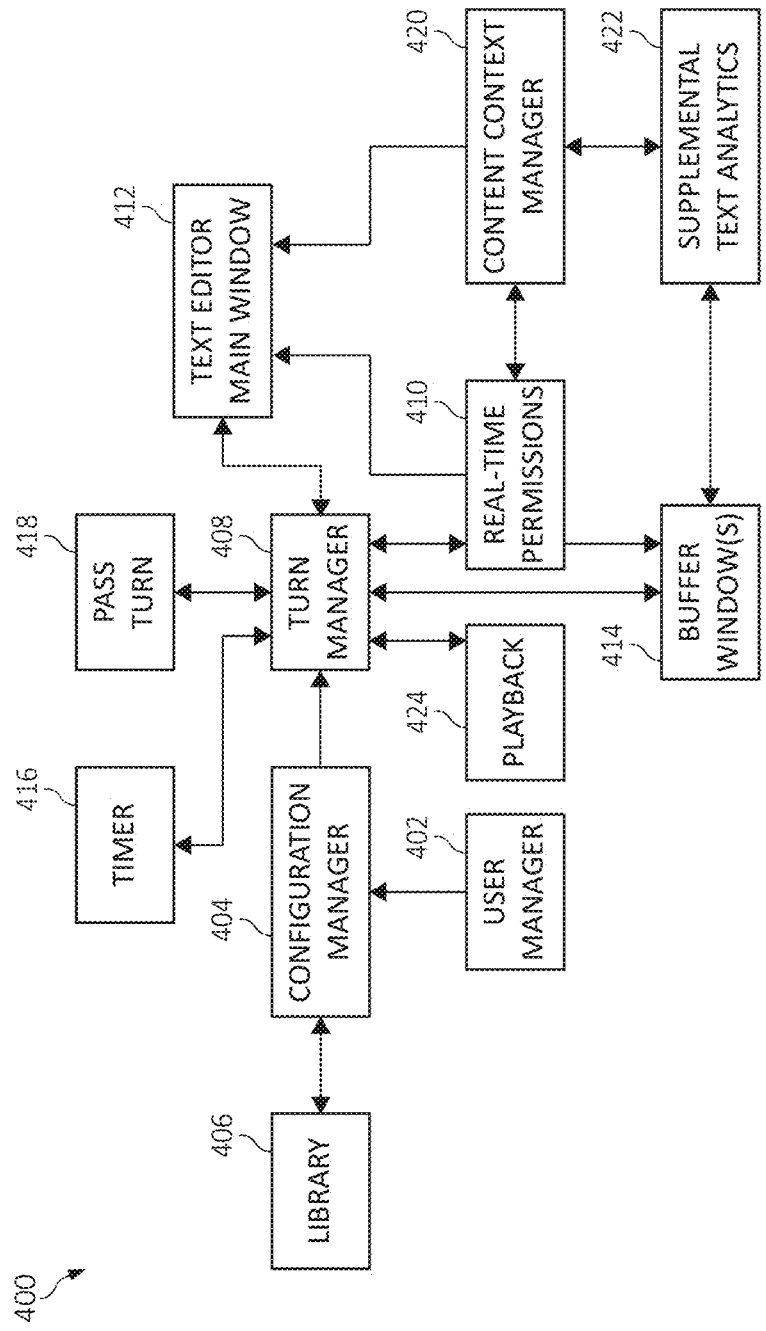
FIG. 4 is a block diagram of system for managing collaborative editing of content according to an embodiment of the present invention.

FIG. 4 illustrates a system 400 for managing collaborative editing (and/or creation) of content according to an embodiment of the present invention. The various components of the system 400 may be implemented on one or more suitable computing device, such as those described above. In embodiments in which the components are implemented on multiple devices, the devices may be located locally or remotely (and be in operable communication via a suitable communications network, on the "cloud," etc.). Although the embodiment shown in FIG. 4 is described as being configured to facilitate or manage the collaborative editing (or creation) of text or text-based content, it should be understood that in other embodiments, the system 400 may be utilized for the editing of other types of content (e.g., software applications, images, etc.), as described above.

As shown in FIG. 4, the system 400 includes a user manager 402. The user manager 402 may receive (and/or retrieve) input regarding, for example, the number of users in a session (i.e., the number of users associated with and/or selected to edit/create a particular piece of content), as well as identifiers (or identification information) of the users and an order to be used in providing the users turns to edit the (primary) content. The functionality of the user manager 402 may be implemented utilizing known access management and user permission tools.

In the example shown, a configuration manager 404 may receive information from the user manager 402, along with input regarding the length(s) (or duration) of the session and/or the editing periods (or turns) for the users, as well as editing attributes (or metrics), such as word count goals, field-level goals, etc. The configuration manager 404 may also instantiate user interface (UI) elements and initiate (or create) a blank document (e.g., a blank word processing document) in instances in which the content is being created (and then edited) by the users or select (and/or retrieve) previously initiated (or created) content (e.g., a previous began/created word processing document) from a library 406. The library 406 may include a memory, file system, database, etc. suitable for storing one or more piece of content.

Still referring to FIG. 4, a turn manager 408 is included, which may allocate the time available and/or time limits to the users (e.g., the duration of the editing periods/turns and/or the cumulative/total time allotted to each user to edit the content). A real-time permissions component 410 may establish the permissions applicable to each of the users and pass the relevant information (e.g., on an ongoing basis, in a continuous manner, etc.) to the turn manager 408, a text editor main window 412, and a buffer window(s) 414 (which may be implemented or displayed within the user interface external to the primary content). Concurrent with the real-time permissions component 410, a timer 416 may track and/or store time for each user (e.g., time the editing periods/turns and/or the cumulative time).

The turn manager 408 may (also) designate the first user and log actions of the real-time permission component 410 and a "pass turn" component 418. The pass turn component 418 may log which user has current text editor main window 412 privileges and which users have buffer window 414 privileges. Additionally, the turn manager 408 may record changes in turns, control the timer 416 (e.g., initiate starting and stopping of the timer), and keep a running total (e.g., cumulative time for each user and/or all users).

A content context manager 420 may manage the location of the active cursor in the document relative to the current length and ordering of the document. A supplemental text analytics component 422 may perform text analysis of any text entered in the buffer window(s) 414 and/or the text editor main window 412 (e.g., in a continuous manner), as described above.

Upon utilization of the pass turn component 418, which may be implemented via a "button" or link in the user interface or activated via keyboard or verbal command, the turn and associated privileges are passed in the designated sequence of the users from the initial user manager 402 selections (i.e., to the next user in the sequence). The session may then proceed as described above.

When the next user is granted editing privileges in the text editor main window 412, the turn manager 408 may enable (or cause) any text (or additional content) written by the user (e.g., during the previous user's turn) in the buffer window(s) 414 to be placed (e.g., or copied/pasted, etc.) in the appropriate places in the primary content (i.e., the primary content is edited based on the additional content created in the buffer window(s) 414).

The session (or exchange of turns) may continue iteratively until, for example, the timer 416 determines end conditions are met (e.g., the time has expired)), the content context manager 420 determines goals or other end conditions are met, and/or a sub-element of the text editor main window 412 (and/or buffer window(s) 414) determines that an approved user has indicated that the session should be ended (e.g., a team leader or administrator may "click" a button in the user interface indicating such and/or the last user has completed their (final) editing period). The (collaboratively) edited document (or content) may then be stored (or saved) in the library 406.

Still referring to FIG. 4, a playback component 424 may be utilized (e.g., in response to an appropriate request, user input, etc.) to display a running succession of the turns entered in the text editor main window 412 including text, which user(s) have entered text (or edited the content), and associated text analytics. The playback component 424 may also be utilized to "playback" the various edits/changes made to the content (e.g., a sequence of all of the turns and/or only particular selected turns) so that the users may view the evolution of the content. In some embodiments, the primary content is displayed in such a way that the contributions made by different users may be distinguished from each other (e.g., the text associated with the contributions of each user is displayed in a unique color, font type, etc.).

Figure 5:
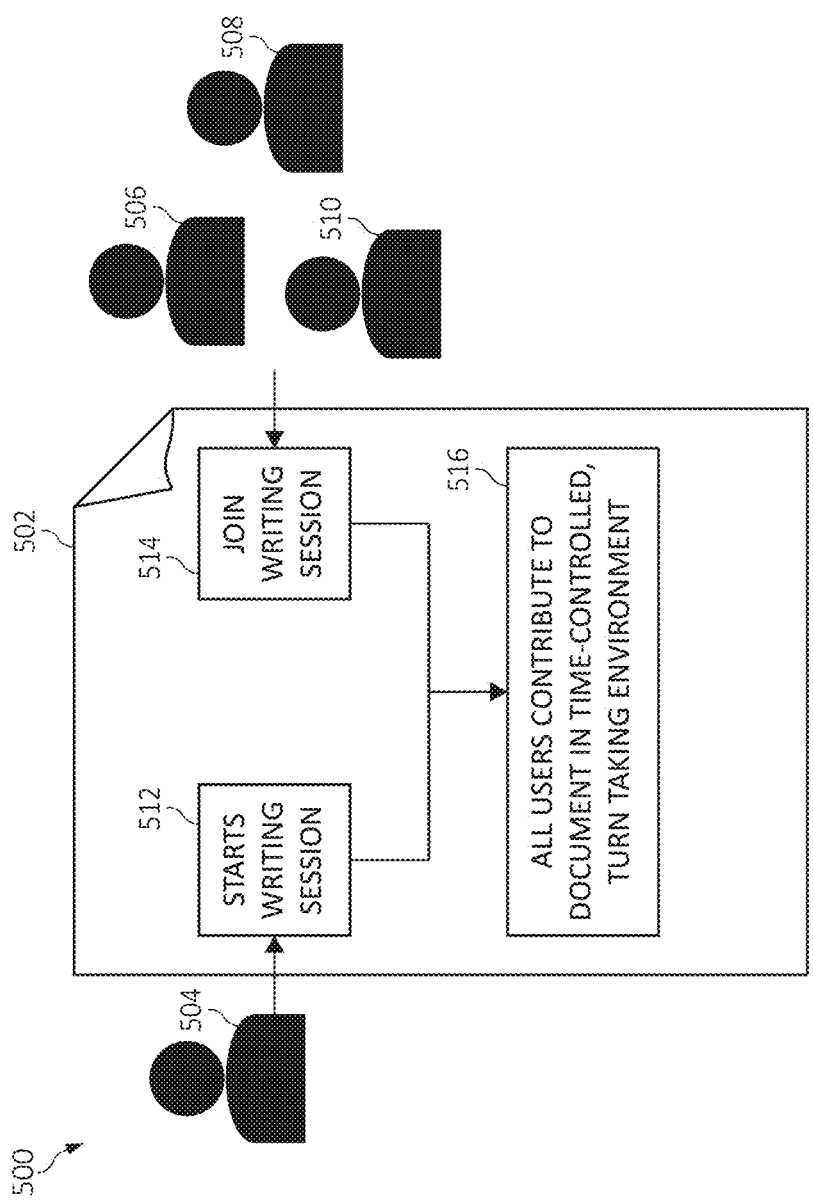
FIG. 5 is a block diagram of a method for managing collaborative editing of content according to an embodiment of the present invention.

FIG. 5 provides a simplified illustration of a method 500 for managing collaborative editing (and/or creation) of content according to an embodiment of the present invention. In the example shown, the content is (or includes) a document (e.g., a text-based document, word processing document, etc.) 502, which is collaboratively edited by a first user 504, along with second, third, and fourth users 506, 508, and 510. It should be understood that the methods and systems described herein may be applied to the collaborative editing of content by any number of users greater than one (e.g., two or more users).

In the example shown, the content editing (and/or creation) begins with the first user 504 beginning a writing (and/or editing) session at block 512. More particularly, the content editing may begin with the system granting (exclusive) editing privileges to the first user 504 (i.e., before the first user 504 opens/accesses/begins to edit the content) and providing the first user 504 with an indication thereof (e.g., via a pop-up window, email, etc.). The second user 506, the third user 508, and the fourth user 510 may join the editing session as described above. More specifically, the system may iteratively grant exclusive editing privileges to the second, third, and fourth users 506, 508, and 510 after the editing period (or turn) of the first user 504 ends. The editing session may continue as described above such that all of the users (e.g., users 504-510) contribute to the editing of the document 502 in a time-controlled, turn taking environment, as indicated at block 516. In some embodiments, the system cycles through the turns of the users 504-510 such that each of the users 504-510 is given exclusive editing privileges multiple times (e.g., each user is given multiple turns).

Figure 6:
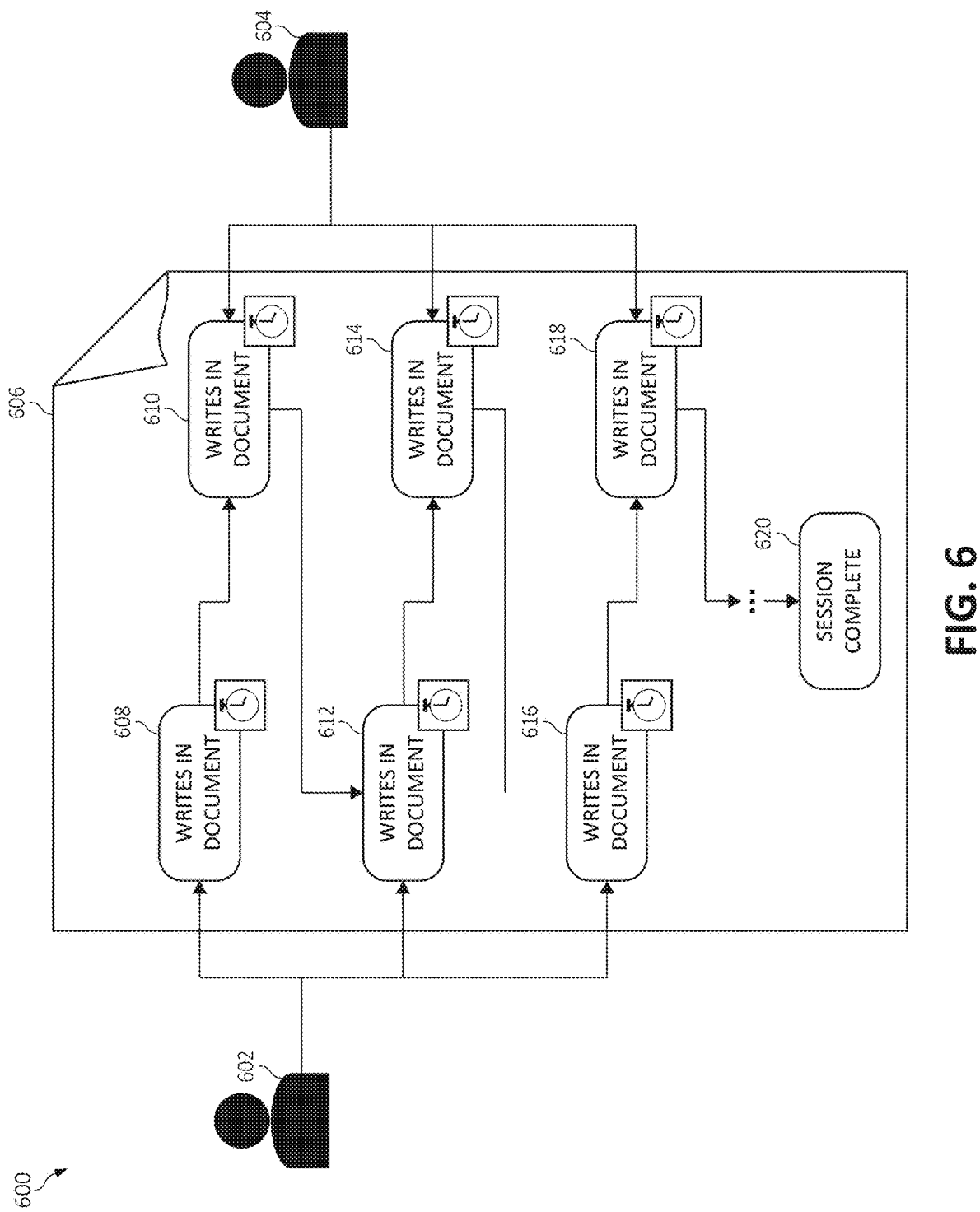
FIG. 6 is a block diagram of an editing session according to an embodiment of the present invention.

FIG. 6 illustrates a collaborative editing session according to an embodiment of the present invention. More specifically, FIG. 6 illustrates a first user 602 and a second user 604 collaboratively editing (or creating) a document 606 (e.g., a text-based document). In the example shown, the first user 602 first writes in (and/or edits) the document 606 during a first writing (or editing) period 608, as granted by the system. The first writing period 608 may begin (or be initiated) before the first user 602 opens/accesses/begins to edit the document 606. As described above, during the first writing period, the second user is locked out/prevented from editing the document 606, but may write/create content in a buffer (as described above) in some embodiments. After the first writing period 608 ends, the second user 604 writes in the document 606 during a second writing period 610 (during which the first user is locked out from editing the document 606). The second writing period 610 may begin after the first writing period 608 ends (i.e., the second writing period 610 may be non-overlapping/not overlap with the first writing period 608) and before the second user 604 opens/accesses/begins to edit the document 606.

As shown, after the second writing period ends, the first user 602 is again given exclusive editing privileges during a third writing period 612. The session proceeds as shown with successive (and/or non-overlapping) writing periods 614, 616, and 618, and other writing periods may be included. At block 620, the editing session is completed, which may be brought about by, for example, the first and second users 602 and 604 completing the scheduled number or turns, requirements/goals being achieved with respect to the document 606, one of the users indicating that the session should be ended, etc.

FIG. 7 illustrates a user interface 700 for collaborative editing of content according to an embodiment of the present invention, as it may be displayed or rendered by a computing device (e.g., a display screen of a computing device). In the example shown, the user interface 700 includes an editing identification (ID) section (or label) 702, a user identification section 704, a timer indicator 706, a main editing window 708, a "submit" button 710, and a buffer section 712.

The editing ID section 702 may be utilized to display an identification of the user who has editing privileges of the content at that time (e.g., the user ID of the user currently making edits to the content). The user ID section may be utilized to display an identification associated with the particular user interface (e.g., the user ID associated with the user utilizing or registered to the user interface 700). The timer indicator 706 may be utilized to display the time remaining and/or time elapsed (e.g., in seconds) in the current editing period (or turn).

Still referring to FIG. 7, the main editing window 708 may be utilized to display the primary content (i.e., the content being collaboratively edited) and may be configured such that the user can interact with (e.g., edit, change, add to, etc.) the content. In other words, the main editing window 708 may be utilized to edit the primary content during an editing period or turn of the user. The submit button 710 may be configured such that the user can interact with it (e.g., by "clicking" it with a cursor or mouse) to indicate that they have completed their edits (e.g., in the event the user completes their edits before the end of their editing period).

The buffer section 712 may be utilized by the user to create additional content (and/or notes, etc.), such as during an editing period of another user. As described above, content created or displayed in the buffer section 712 (e.g., in response to user input) may be utilized to edit the primary content during the next editing period of the respective user.

Figure 8:
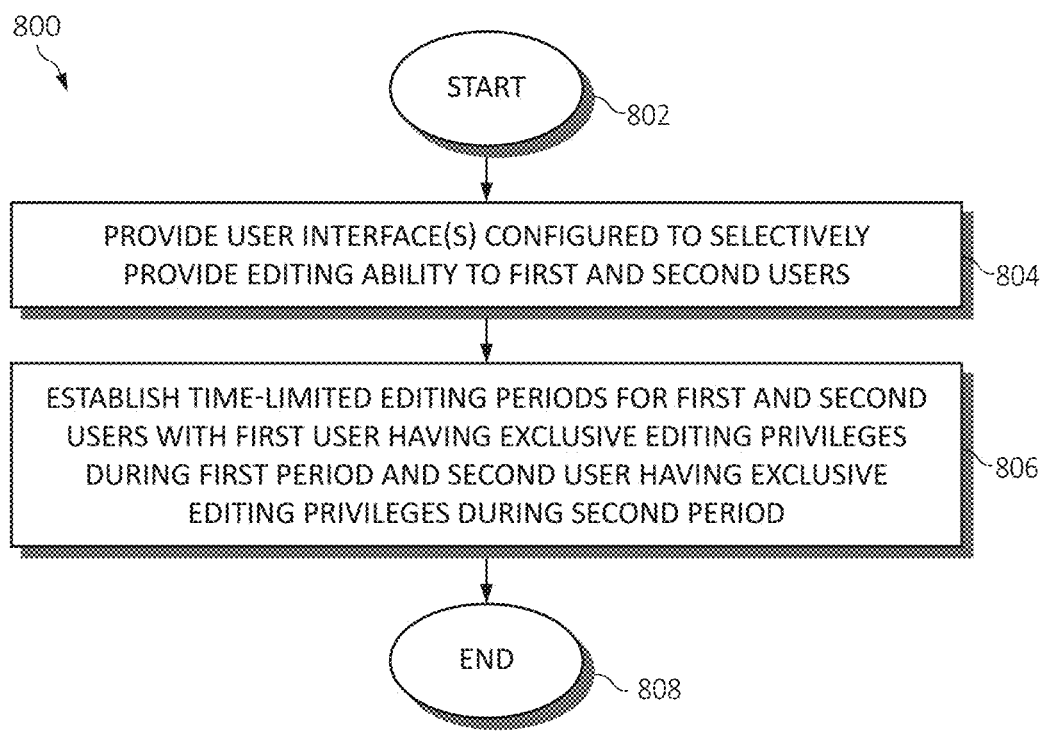
FIG. 8 is a flowchart diagram of an exemplary method for managing collaborative editing of content according to an embodiment of the present invention.

Turning to FIG. 8, a flowchart diagram of an exemplary method 800 for managing collaborative editing of content is provided. The method 800 begins (step 802) with, for example, two ore more users being associated with a piece of content (e.g., a document) and/or being selected (or registered) to edit a previously initiated/began piece of content.

At least one user interface is provided to a first user and a second user (or each of more than two users) (step 804). The at least one user interface is configured to selectively provide the first user and the second user with the (exclusive) ability to edit content, as described above. The content may include a text-based document. However, in other embodiments, other type of content may be edited, such as images, etc. The at least one user interface may include a workspace external to the content (e.g., a workspace or buffer where the users may write/create additional content without editing the primary content).

Time-limited (or timed) editing periods associated with the at least one user interface are established for the first user and the second user (step 806). During a first of the timed editing periods, the first user is provided with the (exclusive) ability to edit the content (e.g., via the at least one user interface), and the second user is prevented from editing the content. During a second of the timed editing periods, the second user is provided with the (exclusive) ability to edit the content, and the first user is prevented from editing the content. In some embodiments, the first and second users are provided with an indication that the respective timed editing period has begun. The timed editing periods may begin before the respective users begin to edit (or open, access, etc.) the content.

The second of the timed editing periods may begin after the first of the timed editing periods ends (and/or not overlap with the first of the timed editing periods). A duration of the first of the timed editing periods may be different than a duration of the second of the timed editing periods. The duration of the editing periods may be a configurable setting. During the first of the timed editing periods, user input may be received from the second user, and additional content associated with the received user input may be caused to be displayed in the workspace. During the second of the timed editing periods, the content may be caused to be edited based on the additional content.

Method 800 ends (step 808) with, for example, the content being saved after the second editing period. However, in some embodiments, the process may be repeated such that each of the users is provided with more than one editing period. In some embodiments, feedback from users may (also) be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing collaborative editing of content, by a processor, comprising:
providing at least one user interface to a first user and a second user, wherein the at least one user interface is configured to selectively provide the first user and the second user with the ability to edit content; and
establishing, prior to the first user and the second user initiating any edits to the content, first time-limited editing periods associated with the at least one user interface for the first user and second time-limited editing periods associated with the at least one user interface for the second user, wherein the first time-limiting editing periods and the second time-limited editing periods each comprise a plurality of fixed-time editing sessions established for each of the first user and the second user, respectively, in a predetermined order, wherein during a first of the first time-limited editing periods, the first user is provided with the ability to edit the content and the second user is prevented from editing the content, and during a first of the second time-limited editing periods, the second user is provided with the ability to edit the content and the first user is prevented from editing the content, and wherein the first of the first time-limited editing periods does not overlap with the first of the second time-limited editing periods.

2. The method of claim 1, wherein the first of the first time-limited editing periods is initiated before the first user begins to edit the content.

3. The method of claim 1, wherein the at least one user interface includes a workspace external to the content, and further comprising, during the first of the first time-limited editing periods, receiving user input from the second user and causing additional content associated with the received user input to be displayed in the workspace.

4. The method of claim 3, further comprising, during the first of the second time-limited editing periods, causing the content to be edited based on the additional content.

5. The method of claim 1, wherein a duration of the first of the first time-limited editing periods is different than a duration of the first of the second time-limited editing periods.

6. The method of claim 1, further comprising causing information associated with edits to the content made by the first user during the first of the first time-limited editing periods to be displayed in the at least one user interface during the first of the second time-limited editing periods.

7. The method of claim 1, wherein the content includes a text-based document.

8. A system for managing collaborative editing of content comprising:
a processor executing instructions stored in a memory device, wherein the processor:
provides at least one user interface to a first user and a second user, wherein the at least one user interface is configured to selectively provide the first user and the second user with the ability to edit content; and
establishes, prior to the first user and the second user initiating any edits to the content, first time-limited editing periods associated with the at least one user interface for the first user and second time-limited editing periods associated with the at least one user interface for the second user, wherein the first time-limiting editing periods and the second time-limited editing periods each comprise a plurality of fixed-time editing sessions established for each of the first user and the second user, respectively, in a predetermined order, wherein during a first of the first time-limited editing periods, the first user is provided with the ability to edit the content and the second user is prevented from editing the content, and during a first of the second time-limited editing periods, the second user is provided with the ability to edit the content and the first user is prevented from editing the content, and wherein the first of the first time-limited editing periods does not overlap with the first of the second time-limited editing periods.

9. The system of claim 8, wherein the first of the first time-limited editing periods is initiated before the first user begins to edit the content.

10. The system of claim 8, wherein the at least one user interface includes a workspace external to the content, and wherein the processor further, during the first of the first time-limited editing periods, receives user input from the second user and causing additional content associated with the received user input to be displayed in the workspace.

11. The system of claim 10, wherein the processor further, during the first of the second time-limited editing periods, causes the content to be edited based on the additional content.

12. The system of claim 8, wherein a duration of the first of the first time-limited editing periods is different than a duration of the first of the second time-limited editing periods.

13. The system of claim 8, wherein the processor further causes information associated with edits to the content made by the first user during the first of the first time-limited editing periods to be displayed in the at least one user interface during the first of the second time-limited editing periods.

14. The system of claim 8, wherein the content includes a text-based document.

15. A computer program product for managing collaborative editing of content, by a processor, the computer program product embodied on a non-transitory computer-readable storage medium having computer-readable program code portions stored therein, the computer-readable program code portions comprising:
an executable portion that provides at least one user interface to a first user and a second user, wherein the at least one user interface is configured to selectively provide the first user and the second user with the ability to edit content; and
an executable portion that establishes, prior to the first user and the second user initiating any edits to the content, first time-limited editing periods associated with the at least one user interface for the first user and second time-limited editing periods associated with the at least one user interface for the second user, wherein the first time-limiting editing periods and the second time-limited editing periods each comprise a plurality of fixed-time editing sessions established for each of the first user and the second user, respectively, in a predetermined order, wherein during a first of the first time-limited editing periods, the first user is provided with the ability to edit the content and the second user is prevented from editing the content, and during a first of the second time-limited editing periods, the second user is provided with the ability to edit the content and the first user is prevented from editing the content, and wherein the first of the first time-limited editing periods does not overlap with the first of the second time-limited editing periods.

16. The computer program product of claim 15, wherein the first of the first time-limited editing periods is initiated before the first user begins to edit the content.

17. The computer program product of claim 15, wherein the at least one user interface includes a workspace external to the content, and wherein the computer-readable program code portions further include an executable portion that, during the first of the first time-limited editing periods, receives user input from the second user and causing additional content associated with the received user input to be displayed in the workspace.

18. The computer program product of claim 17, wherein the computer-readable program code portions further include an executable portion that, during the first of the second time-limited editing periods, causes the content to be edited based on the additional content.

19. The computer program product of claim 15, wherein a duration of the first of the first time-limited editing periods is different than a duration of the first of the second time-limited editing periods.

20. The computer program product of claim 15, wherein the computer-readable program code portions further include an executable portion that causes information associated with edits to the content made by the first user during the first of the first time-limited editing periods to be displayed in the at least one user interface during the first of the second time-limited editing periods.

21. The computer program product of claim 15, wherein the content includes a text-based document.

\* \* \* \* \*